（12）United States Patent
Haraguchi et al.

(10) Patent No.: US 10,185,164 B2
(45) Date of Patent: Jan. 22, 2019

(54) OPTICAL FREQUENCY CONTROL DEVICE

(71) Applicant: Mitsubishi Electric Corporation, Tokyo (JP)

(72) Inventors: Eisuke Haraguchi, Tokyo (JP); Toshiyuki Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 15/504,927

(22) PCT Filed: Aug. 31, 2015

(86) PCT No.: PCT/JP2015/074718
§ 371 (c)(1),
(2) Date: Feb. 17, 2017

(87) PCT Pub. No.: WO2016/043036
PCT Pub. Date: Mar. 24, 2016

(65) Prior Publication Data
US 2018/0196288 A1    Jul. 12, 2018

(30) Foreign Application Priority Data
Sep. 17, 2014   (JP) .................. 2014-189070

(51) Int. Cl.
*G02F 1/01*        (2006.01)
*H01S 3/10*        (2006.01)
(52) U.S. Cl.
CPC .............. *G02F 1/0121* (2013.01); *G02F 1/01* (2013.01); *H01S 3/10* (2013.01); *G02F 2203/50* (2013.01)

(58) Field of Classification Search
CPC ...... G02F 1/0121; G02F 1/01; G02F 2203/50; H01S 3/10
See application file for complete search history.

(56) References Cited

U.S. PATENT DOCUMENTS 8,538,263 B2 * 9/2013 Ogasahara .............. H04J 14/06
398/147
2004/0008403 A1   1/2004 Kondoh et al.
2012/0087654 A1   4/2012 Ogasahara

FOREIGN PATENT DOCUMENTS

| JP | S61-248022 A | 11/1986 |
| JP | S62-162382 A | 7/1987 |
| JP | H01-168085 A | 7/1989 |
| JP | H07-131419 A | 5/1995 |
| JP | H08-054586 A | 2/1996 |
| JP | H08-285875 A | 11/1996 |
| JP | H10-206919 A | 8/1998 |

(Continued)

OTHER PUBLICATIONS

Extended European Search Report issued by the European Patent Office dated May 14, 2018, which corresponds to EP15842029.9-1209 and is related to U.S. Appl. No. 15/504,927.

(Continued)

*Primary Examiner* — Joseph P Martinez
(74) *Attorney, Agent, or Firm* — Studebaker & Brackett PC

(57)  ABSTRACT

An optical frequency control device includes a light source for emitting light, a sawtooth wave generator for generating a sawtooth wave, a frequency controller for controlling the frequency of the sawtooth wave, and an optical phase modulator driven by the sawtooth wave for carrying out phase modulation of the light.

2 Claims, 4 Drawing Sheets

(56) References Cited

FOREIGN PATENT DOCUMENTS

| JP | H11-274631 | A | 10/1999 |
| JP | 2003-315860 | A | 11/2003 |
| JP | 3840216 | B2 | 11/2006 |
| JP | 2011-066802 | A | 3/2011 |
| WO | 2010/140289 | A1 | 12/2010 |

OTHER PUBLICATIONS

An Office Action issued by the Japanese Patent Office dated Jun. 6, 2017, which corresponds to Japanese Patent Application No. 2016-506699 and is related to U.S. Appl. No. 15/504,927; with English language translation, 3pp.
Ebherg, A. et al.; "Closed-loop fiber-optic gyroscope with a sawtooth phase-modulated feedback"; Optics Letters. vol. 10, No. 8, Jun. 1985; 3pp.
International Search Report issued in PCT/JP2015/074718; dated Nov. 2, 2015.
Nunoya, Nobuhiro et al.; "Expansion of tuning range in phase controlled tunable wavelength DFB laser"; Technical report of IEICE. LQE; Jun. 22, 2007; pp. 11-14, vol. 107, Issue 125; CiNii; Japan.
Rogers, C.E. et al.; "Creation of Arbitrary Time-Sequenced Line Spectra with an Electro-Optic Phase Modulator"; Review of Scientific Instruments; 2011; pp. 073107-073107-3; vol. 82, Issue 7; The Smithsonian/NASA Astrophysics Data System; U.S.A.

* cited by examiner

OPTICAL FREQUENCY CONTROL DEVICE

TECHNICAL FIELD

The present invention relates to an optical frequency control device with an optical phase modulator.

BACKGROUND ART

Conventionally, in a case where the center frequency of a laser in an external cavity single mode is continuously swept, a center wavelength is set by altering the operation temperature of the laser. However, there is a problem in that oscillation wavelengths become discontinuous due to mode hopping at changes in temperature. In addition, a response time to a change in the center wavelength resulting from the changes in temperature is about a few seconds, which makes it impossible to achieve high speed changes.

Accordingly, as a conventional method of avoiding the mode hopping, there has been proposed a configuration in which an optical filter or an external cavity length is variably set in accordance with the changes in the center wavelength (see, Patent Document 1, for example).

CITATION LIST

Patent Literature

Patent Document 1: Japanese Patent Laid-Open No. 11-274631/1999.

SUMMARY OF INVENTION

Technical Problem

However, there is a problem with a configuration disclosed in the Patent Document 1, which fails to make a quick response and necessitates the designing of a filter for each wavelength.

The present invention is implemented to solve the foregoing problems. Therefore, it is an object of the present invention to provide an optical frequency control device capable of carrying out continuous sweep of the center frequency of output light and capable of making a quick response.

Solution to Problem

An optical frequency control device in accordance with the present invention comprises: a light source to emit light; a sawtooth wave controller to generate a sawtooth wave; a frequency controller to control a frequency of the sawtooth wave generated by the sawtooth wave controller; an optical phase modulator driven by the sawtooth wave generated by the sawtooth wave controller to carry out phase modulation of the light emitted by the light source; an optical split coupler to split part of the light phase-modulated by the optical phase modulator; and an optical filter to convert frequency variation of the light split by the optical split coupler to intensity variation, wherein the sawtooth wave controller generates the sawtooth wave in a manner as to keep constant the intensity variation, which is converted by the optical filter.

Advantageous Effects of Invention

According to the present invention, the foregoing configuration allows the implementation of the continuous sweep of the center frequency of the output light and achieves a quick response.

BRIEF DESCRIPTION OF DRAWINGS

FIGS. 2A-C are diagrams illustrating the overall operation of the optical frequency control device according to the embodiment 1 of the present invention, in which FIG. 2A is a diagram showing the light from the light source, FIG. 2B is a diagram showing a sawtooth wave from a sawtooth wave generator, and FIG. 2C is a diagram showing output light from an optical phase modulator;

DESCRIPTION OF EMBODIMENTS

The best mode for carrying out the invention will now be described with reference to the accompanying drawings to explain the present invention in more detail.

Embodiment 1

Figure 1:
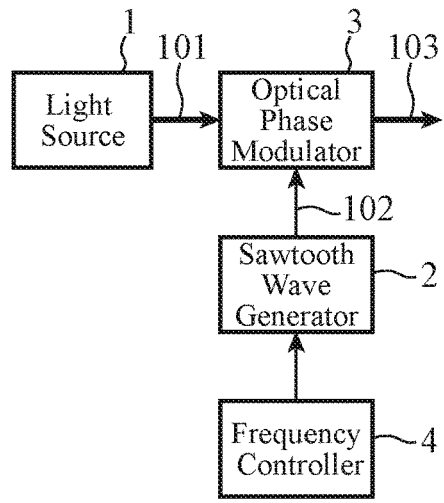
FIG. 1 is a block diagram showing a configuration of an optical frequency control device according to an embodiment 1 of the present invention.

FIG. 1 is a block diagram showing a configuration of an optical frequency control device according to an embodiment 1 of the present invention.

The optical frequency control device outputs light (output light) 103 with a frequency set at a discretionary value. As shown in FIG. 1, the optical frequency control device is comprised of a light source 1, a sawtooth wave generator 2, an optical phase modulator 3, and a frequency controller 4.

The light source 1 emits light (reference light) 101 with a single frequency. The light 101 emitted by the light source 1 is supplied to the optical phase modulator 3.

The sawtooth wave generator 2 generates a sawtooth wave 102 supplied to the optical phase modulator 3 in response to the control of the frequency controller 4. The sawtooth wave 102 generated by the sawtooth wave generator 2 is supplied to the optical phase modulator 3.

The optical phase modulator 3 is driven by the sawtooth wave 102 from the sawtooth wave generator 2 so as to carry out the phase modulation of the light 101 from the light source 1 and operates as an optical Voltage Controlled Oscillator (VCO). The light 103 (modulation signal light, pulsed signal light or the like) phase-modulated by the optical phase modulator 3 is output to the outside.

The frequency controller 4 controls the frequency of the light 103 to be output from the optical frequency control device by controlling the frequency of the sawtooth wave 102 of the sawtooth wave generator 2. The frequency controller 4 is implemented by program processing based on software with a CPU.

Figure 2A:
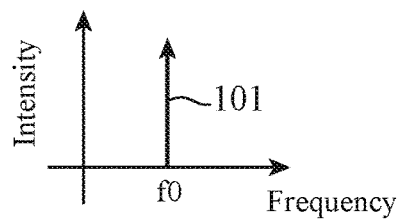
Figure 2B:
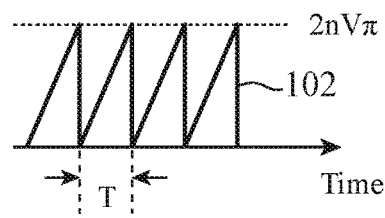
Figure 2C:
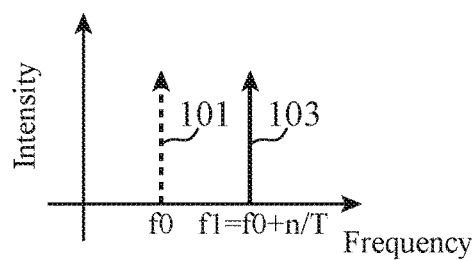

Next, the operation of the optical frequency control device with the foregoing configuration will be described with reference to FIGS. 2A-C.

In the operation of the optical frequency control device, the light source 1 emits the light 101 (FIG. 2A) with a single frequency, first. On the other hand, the frequency controller 4 sets the frequency of the sawtooth wave 102 to be supplied to the optical phase modulator 3. Then, the sawtooth wave generator 2 generates the sawtooth wave 102 (FIG. 2B) with the same frequency as the foregoing set frequency and supplies the sawtooth wave 102 to the optical phase modulator 3. Thus, the optical phase modulator 3, which is driven by the sawtooth wave 102, carries out the phase modulation of the light 101 from the light source 1 and outputs the output light 103 (FIG. 2C) to the outside.

Here, it is assumed that the center frequency of the light 101 emitted from the light source 1 is f0, and the center frequency of the light 103 phase-modulated by the optical phase modulator 3 is f1. In addition, it is assumed that the period of the sawtooth wave 102 is T, and the signal amplitude of the optical phase modulator 3 is 2 nVπ (where n is a modulation factor (integer), and Vπ is a voltage capable of shifting the phase of the optical phase modulator 3 by π). In addition, it is assumed that the phase shifted by the optical phase modulator 3 is dφ. In this case, the center frequency f1 of the light 103 output from the optical frequency control device is given by the following Expression (1). It is found from Expression (1) that a frequency variable amount is determined by the period T of the sawtooth wave 102 and the modulation factor n.

$$f1=f0+\delta f$$

$$\delta f = d\varphi/dt = n/T \quad (1)$$

Figure 3:
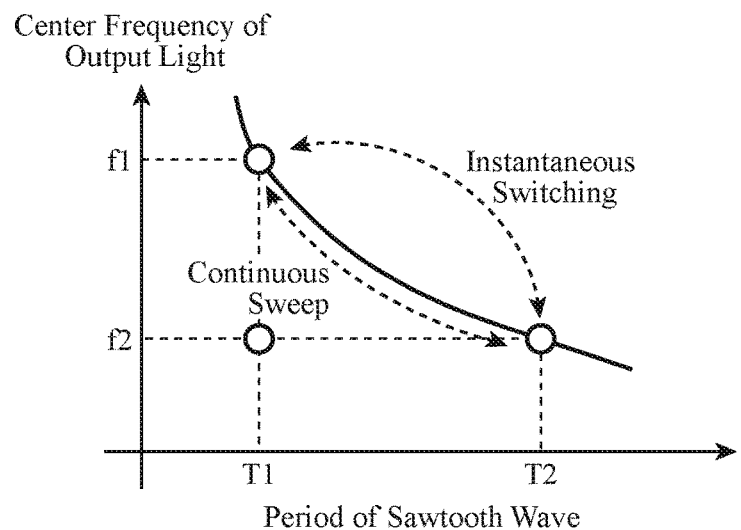
FIG. 3 is a diagram illustrating the center frequency of the output light when the period of the sawtooth wave is altered in the optical frequency control device according to the embodiment 1 of the present invention.

FIG. 3 shows the center frequency of the output light 103 from the optical phase modulator 3 in a case where the period of the sawtooth wave 102 is changed.

In FIG. 3, when the period of the sawtooth wave 102 is continuously swept (T1 to T2), the center frequency of the output light 103 is also continuously swept without any discontinuity (f1 to f2). In addition, when the period of the sawtooth wave 102 is instantaneously switched from T1 to T2, the frequency of the output light 103 is also instantaneously switched from f1 to f2.

The optical phase modulator 3 can perform the modulation in a bandwidth (40 GHz), increase the range of the center frequency of the output light 103 (an increase in a continuous sweep range), as compared with the conventional configuration, and carry out high-speed control (instantaneous switching and picosecond response).

As described above, according to the present embodiment 1, the optical frequency control device comprises the light source 1 to emit the light 101; the sawtooth wave generator 2 to generate the sawtooth wave 102, the frequency controller 4 to control the frequency of the sawtooth wave 102; and the optical phase modulator 3 driven by the sawtooth wave 102 to carry out the phase modulation of the light 101. Accordingly, the optical frequency control device can continuously sweep the center frequency of the output light 103 and achieve the optical frequency control with a wide dynamic range and a broad control band, which enables a quick response.

Embodiment 2

The embodiment 1 represents the configuration in which the optical frequency control is achieved by using only the optical phase modulator 3. In contrast with the embodiment 1, an embodiment 2, in which both the temperature control (frequency control) of the light source 1 and the control by the optical phase modulator 3 are used, represents the optical frequency control with a wider dynamic range than that of the embodiment 1.

Figure 4:
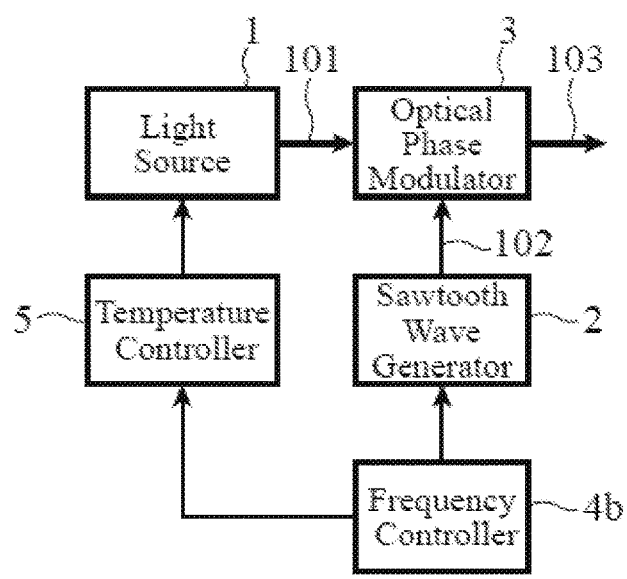
FIG. 4 is a block diagram showing a configuration of the optical frequency control device according to an embodiment 2 of the present invention.

FIG. 4 is a block diagram showing the configuration of the optical frequency control device according to the embodiment 2 of the present invention. The optical frequency control device of the embodiment 2 shown in FIG. 4 is configured by adding a temperature controller 5 to the optical frequency control device of the embodiment 1 shown in FIG. 1, and by changing the frequency controller 4 to a frequency controller 4b. Since the other components are the same, they are designated by the same reference symbols, and their description will be omitted.

The temperature controller 5 sets the frequency of the light 101 emitted by the light source 1 by altering the operation temperature of the light source 1.

The frequency controller 4b controls the frequency of the sawtooth wave 102 of the sawtooth wave generator 2 and controls the frequency of the light 101 emitted from the light source 1 by the control of the temperature controller 5, thereby controlling the frequency of the light 103 the optical frequency control device outputs. The frequency controller 4b is implemented by the program processing based on software with a CPU.

The signal output from the sawtooth wave generator 2 is the sawtooth wave 102, and the optical phase modulator 3 operates as the optical VCO as shown in the embodiment 1.

Figure 5:
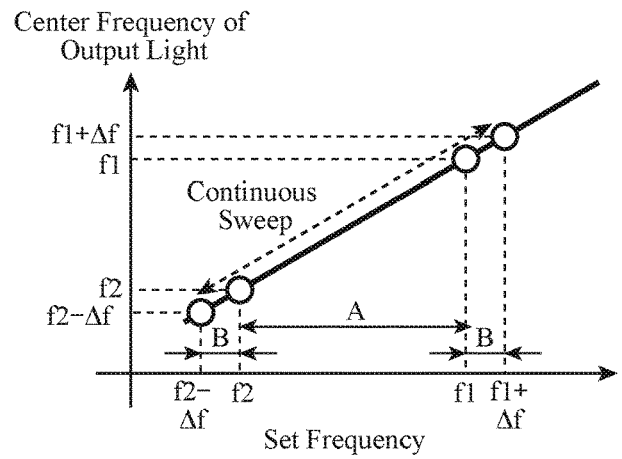
FIG. 5 is a diagram illustrating an instance when carrying out continuous sweep of the frequency supplied to an optical phase modulator in the optical frequency control device according to the embodiment 2 of the present invention.

In the embodiment 2, the optical phase modulator 3 carries out the phase modulation of the light 101, which goes through the temperature control by the temperature controller 5, from the light source 1, and the optical phase modulator 3 outputs the phase-modulated light 101 to the outside as the output light 103. Incidentally, the sawtooth wave 102 is supplied to the optical phase modulator 3. Here, in a case where the center frequency of the output light 103 as shown in FIG. 5 is continuously swept, it is assumed that a frequency control range A of the optical phase modulator 3 by the application of the sawtooth wave 102 is (f1−f2), and a frequency control enabled range B under the temperature control is Δf. In this case, carrying out the individual control independently enables the optical frequency control in a wider dynamic range (f1−f2+2Δf).

As described above, according to the present embodiment 2, using the temperature control together with the light phase modulation control with the sawtooth wave 102 makes it possible to carry out the optical frequency control in a wider dynamic range as compared with the configuration of the embodiment 1.

Embodiment 3

An embodiment 3 shows the optical frequency control device capable of operating as a high-speed optical switch.

Figure 6:
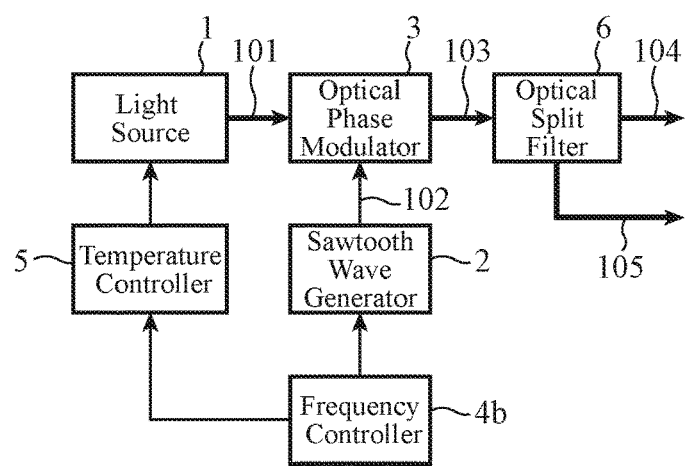
FIG. 6 is a block diagram showing the configuration of the optical frequency control device according to an embodiment 3 of the present invention.

FIG. 6 is a block diagram showing the configuration of the optical frequency control device according to the embodiment 3 of the present invention. An optical split filter 6, which is not provided in the optical frequency control device of the embodiment 2 shown in FIG. 4, is added to the optical frequency control device of the embodiment 3 shown in FIG. 6. Since the other components are the same, they are designated by the same reference symbols, and their description will be omitted.

The optical split filter 6, which is provided after the optical phase modulator 3, switches optical paths, through which the light 103 is outputted, on the basis of the comparison of the frequency of the light 103 phase-modulated by the optical phase modulator 3 with a split frequency. The optical split filter 6 is comprised of, for example, Dense Wavelength Division Multiplexing (DWDM), or the like. Instantaneously switching the center frequency of the light 103 to be input to the optical split filter 6 enables the high-speed switching of the optical path.

In addition, the signal output from the sawtooth wave generator 2 is the sawtooth wave 102, and the optical phase modulator 3 operates as the optical VCO as shown in the embodiment 1.

In the embodiment 3, being driven by the sawtooth wave 102, the optical phase modulator 3 carries out the phase modulation of the light 101 from the light source 1 and outputs the phase-modulated light as the output light 103. Thus, the output light 103 from the optical phase modulator 3 is output to the outside via the optical split filter 6 as the output light 104 or the output light 105.

Figure 7:
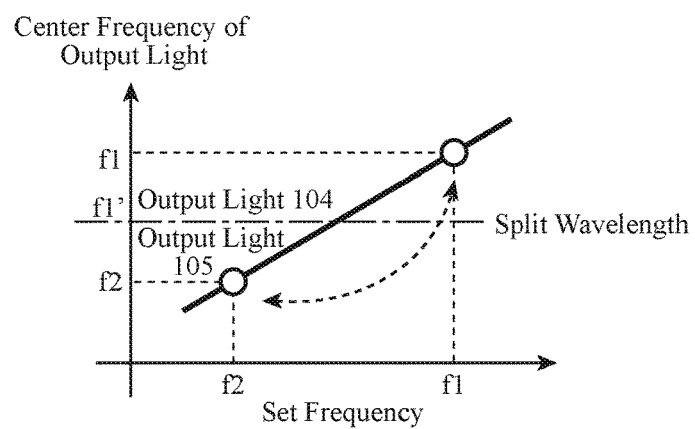
FIG. 7 is a diagram illustrating an instance in which frequencies to be supplied to the optical phase modulator are instantaneously switched, with regard to the optical frequency control device according to the embodiment 3 of the present invention.

Here, as shown in FIG. 7, instantaneously switching the frequency of the sawtooth wave 102 to be supplied to the optical phase modulator 3 enables the change of the center frequency of the output light 103 between f1 and f2. In addition, assuming that the split frequency of the optical split filter 6 is f1', in a case where the center frequency of the output light 103 is f1, the output light 103 is output to the outside as the output light 104, and in a case where the center frequency of the output light 103 is f2, the output light 103 is output as the output light 105. Accordingly, two optical paths can instantaneously be switched.

Incidentally, the foregoing shows the example in which the optical split filter 6 is added to the optical frequency control device of the embodiment 2 shown in FIG. 4. Furthermore, it may be such that the optical split filter 6 is added to the optical frequency control device of the embodiment 1 shown in FIG. 1.

As described above, according to the present embodiment 3, the optical frequency control device comprises the optical split filter 6 which compares the frequency of the light 103 with the split frequency and switches the optical paths through which the light 103 is outputted. Accordingly, the configuration of the optical frequency control device of the embodiment 3 enables the high-speed switching of the optical paths (operate as a high-speed optical switch), compared with the configuration of the optical frequency control device of the embodiment 1 or 2.

Embodiment 4

The embodiments 1 to 3 show the configurations in which the sawtooth wave 102, for which the frequency control is made, is supplied to the optical phase modulator 3, to which the light 101 from the light source 1 is inputted, thereby implementing the optical frequency control. In contrast with the embodiments 1 to 3, an embodiment 4 shows a configuration in which a function of feeding back the noise of the light source 1 to the optical phase modulator 3 is provided, thereby implementing the optical frequency control in a narrow line width.

Figure 8:
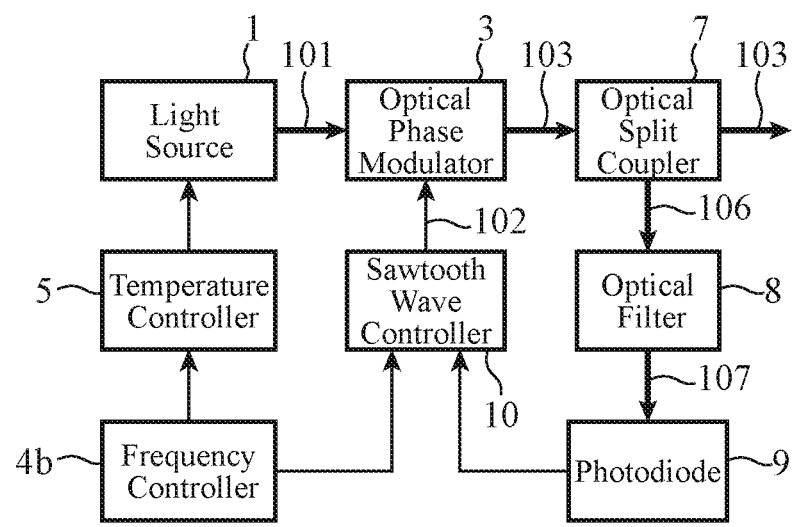
FIG. 8 is a block diagram showing the configuration of the optical frequency control device according to an embodiment 4 of the present invention.

FIG. 8 is a block diagram showing the configuration of an optical frequency control device according to the embodiment 4 of the present invention. The optical frequency control device of the embodiment 4 shown in FIG. 8 is one in which the sawtooth wave generator 2 of the optical frequency control device of the embodiment 2 shown in FIG. 4 is replaced by a sawtooth wave controller (sawtooth wave generator) 10, and an optical split coupler 7, an optical filter 8, and a photodiode 9 are added. Since the other components are the same, they are designated by the same reference symbols, and their description will be omitted.

Incidentally, the frequency controller 4b controls the frequency of the light 103 outputted from the optical frequency control device by controlling the frequency (offset frequency) of the sawtooth wave 102 of the sawtooth wave controller 10, and by controlling the frequency of the light 101 emitted from the light source 1 under the control of the temperature controller 5.

The optical split coupler 7 divides part of the light 103 phase-modulated by the optical phase modulator 3. The light 106 split by the optical split coupler 7 is supplied to the optical filter 8.

The optical filter 8 converts the frequency variation of the light 106 from the optical split coupler 7 to intensity variation. The light 107 converted to the intensity variation through the optical filter 8 is supplied to the photodiode 9.

The photodiode 9 receives the light 107 from the optical filter 8. A signal indicating the intensity variation of the light 107 received by the photodiode 9 is outputted to the sawtooth wave controller 10. This enables a noise component detected by the optical filter 8 to be fed back to the sawtooth wave controller 10 as an instantaneous value of the sawtooth wave 102.

In addition to the function of the sawtooth wave generator 2, the sawtooth wave controller 10 has a function of generating the sawtooth wave 102 in such a manner that the intensity variation of the light 107 becomes constant in response to the signal from the photodiode 9. The sawtooth wave 102 generated by the sawtooth wave controller 10 is supplied to the optical phase modulator 3. The sawtooth wave controller 10 can be composed of, for example, a circuit for generating the sawtooth wave 102, a loop filter, and the like.

Incidentally, the optical phase modulator 3 is driven by the sawtooth wave 102 from the sawtooth wave controller 10 to carry out the phase modulation of the light 101 from the light source 1, and operates as the optical VCO as in the embodiment 1.

In the embodiment 4, being driven by the sawtooth wave 102, the optical phase modulator 3 carries out the phase modulation of the light 101 output from the light source 1, and outputs the phase-modulated light 101 to the outside as the output light 103. Incidentally, the light source 1 undergoes the temperature control of the temperature controller 5. In addition, part of the output light 103 of the optical phase modulator 3 is split by the optical split coupler 7 as the split light 106. Then the optical filter 8 converts the frequency variation of the split light 106 to the intensity variation, and the photodiode 9 receives the light. Then the sawtooth wave controller 10 generates the sawtooth wave 102 in such a manner as to make the intensity variation constant, thereby suppressing the noise of the light source 1 from the output light 103 to the outside.

Figure 9:
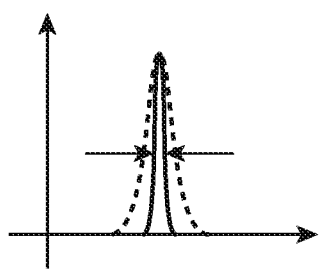
FIG. 9 is a diagram showing longitudinal mode line widths of the output light before and after light-source noise suppression in the optical frequency control device according to the embodiment 4 of the present invention.

Here, the longitudinal mode line width of the output light 103 before and after the noise suppression of the light source 1 is represented, for example, as in FIG. 9. In FIG. 9, a broken line shows the output light 103 before the noise suppression, and a solid line shows the output light 103 after the noise suppression. As shown in FIG. 9, the noise is suppressed by the sawtooth wave 102 supplied to the optical phase modulator 3, and the line width of the output light 103 is reduced.

As described above, according to the present embodiment 4, the optical frequency control device comprises the optical split coupler 7 to split part of the light 103 phase-modulated by the optical phase modulator 3; the optical filter 8 to convert the frequency variation of the light 106 split by the optical split coupler 7 to the intensity variation; and the sawtooth wave controller 10 to generate the sawtooth wave 102 in such a manner as to keep constant the intensity variation of the light 107 converted through the optical filter 8, and supplies the sawtooth wave 102 to the optical phase modulator 3. With the configuration, the optical frequency control device can also continuously sweep the center frequency of the output light 103 and can achieve the optical frequency control with a wide dynamic range and a wide control band capable of making a quick response. In addition, the optical frequency control device can reduce the line width of the output light 103.

Incidentally, it is assumed in the embodiments 1 to 4 that the frequency controller 4 or 4b and the sawtooth wave controller 10 control the sawtooth wave 102 in an analog manner. However, this does not limit the invention to the analog systems, but digital systems are also applicable.

Incidentally, it is to be understood that a free combination of the individual embodiments, variations of any components of the individual embodiments or removal of any components of the individual embodiments is possible within the scope of the present invention.

INDUSTRIAL APPLICABILITY

An optical frequency control device according to the present invention comprises a frequency controller for controlling the frequency of the sawtooth wave generated by a sawtooth wave generator, and an optical phase modulator that is driven by the sawtooth wave generated by the sawtooth wave generator and carries out phase modulation of the light emitted by a light source. Accordingly, the optical frequency control device can continuously sweep the center frequency of the output light and make a quick response, which is suitable for producing output light with any desired frequency.

REFERENCE SIGNS LIST 1 light source; 2 sawtooth wave generator; 3 optical phase modulator; 4, 4b, 4c frequency controller; 5 temperature controller; 6 optical split filter; 7 optical split coupler; 8 optical filter; 9 photodiode; 10 sawtooth wave controller (sawtooth wave generator); 101 light; 102 sawtooth wave; 103-105 output light; 106, 107 light.

The invention claimed is:
1. An optical frequency control device comprising:
a light source to emit light;
a sawtooth wave controller to generate a sawtooth wave;
a frequency controller to control a frequency of the sawtooth wave generated by the sawtooth wave controller;
an optical phase modulator driven by the sawtooth wave generated by the sawtooth wave controller to carry out phase modulation of the light emitted by the light source;
an optical split coupler to split part of the light phase-modulated by the optical phase modulator; and
an optical filter to convert frequency variation of the light split by the optical split coupler to intensity variation, wherein
the sawtooth wave controller generates the sawtooth wave in a manner as to keep constant the intensity variation, which is converted by the optical filter.
2. The optical frequency control device according to claim 1, wherein
the optical phase modulator carries out phase modulation of the light emitted by the light source to produce modulation signal light.

\* \* \* \* \*